United States Patent
Xu

(10) Patent No.: US 11,832,591 B1
(45) Date of Patent: Dec. 5, 2023

(54) PET LIGHT-EMITTING SAFETY DEVICE, PET CHEST AND BACK HARNESS, AND PET COLLAR

(71) Applicant: GUANGZHOU QIANQIAN PET PRODUCTS CO., LTD., Guangzhou (CN)

(72) Inventor: Quan Xu, Zhongxiang (CN)

(73) Assignee: GUANGZHOU QIANQIAN PET PRODUCTS CO., LTD., Guangzhou (CN)

( * ) Notice: Subject to any disclaimer, the term of this patent is extended or adjusted under 35 U.S.C. 154(b) by 0 days.

(21) Appl. No.: 17/884,683

(22) Filed: Aug. 10, 2022

(30) Foreign Application Priority Data

Jul. 25, 2022 (CN) .......................... 202221917240.4

(51) Int. Cl.
*A01K 27/00* (2006.01)
*F21L 4/00* (2006.01)
*F21Y 115/10* (2016.01)

(52) U.S. Cl.
CPC .............. *A01K 27/006* (2013.01); *F21L 4/00* (2013.01); *F21Y 2115/10* (2016.08)

(58) Field of Classification Search
CPC ....... A01K 27/006; F21L 4/00; F21Y 2115/10
See application file for complete search history.

(56) References Cited

U.S. PATENT DOCUMENTS

| 5,046,456 | A | * | 9/1991 | Heyman | A01K 27/006 362/108 |
| 5,074,251 | A | * | 12/1991 | Pennock | A01K 27/006 362/108 |
| 5,249,106 | A | * | 9/1993 | Barnes | A41D 13/01 362/108 |
| 9,410,694 | B2 | * | 8/2016 | Curran | H05B 47/105 |
| D862,003 | S | * | 10/2019 | Wu | D30/152 |
| 11,365,878 | B2 | * | 6/2022 | Willows | F21V 33/0008 |
| 2002/0122316 | A1 | * | 9/2002 | Hsieh | A44C 15/0015 362/108 |
| 2005/0217611 | A1 | * | 10/2005 | Morehead | A01K 27/006 119/859 |
| 2007/0256646 | A1 | * | 11/2007 | Ayscue | A01K 27/006 119/859 |

(Continued)

*Primary Examiner* — Evan P Dzierzynski
(74) *Attorney, Agent, or Firm* — Daniel M. Cohn; Howard M. Cohn

(57) ABSTRACT

A pet light-emitting safety device includes a light guide bar and a light source controller controlling light transmitting to the light guide bar. The light guide bar includes a light-emitting body and fixing portions connected to the light-emitting body. The fixing portions define end surfaces configured to input the light. The light source controller includes a box body, a main control board accommodated in the box body, and light sources connected to the main control board. Sides of the box body defines channels fixing the fixing portions. The fixing portions are separately inserted into a corresponding channel. Each of the light sources is arranged on one end of each of the fixing portions away from the corresponding channel. Light-emitting surfaces of the light sources face the end surfaces of the fixing portions. A pet chest and back harness and a pet collar include the pet light-emitting safety device.

13 Claims, 5 Drawing Sheets

(56) References Cited

U.S. PATENT DOCUMENTS

| | | | |
|---|---|---|---|
| 2011/0197826 A1* | 8/2011 | Hurwitz | A01K 27/006 119/859 |
| 2013/0128556 A1* | 5/2013 | Brauser | A01K 27/006 362/108 |
| 2015/0090195 A1* | 4/2015 | Krupich | A01K 27/003 119/858 |
| 2021/0127638 A1* | 5/2021 | Kornegay | A01K 27/006 |

* cited by examiner

PET LIGHT-EMITTING SAFETY DEVICE, PET CHEST AND BACK HARNESS, AND PET COLLAR

TECHNICAL FIELD

The present disclosure relates to a field of pet products, in particular to a pet light-emitting safety device, a pet chest and back harness, and a pet collar.

BACKGROUND

With improvement of living standards, more and more families choose to keep dogs, cats and other pets as life companions and to increase joy and happiness. People need to buy corresponding pet supplies for pets. Among them, lasso tools such as chest harnesses or collars, which prevent pets from wandering, loss and injury to others, are necessities when taking pets out.

In actual use, because there is no light-emitting device arranged on a conventional pet lasso tool, such as a chest and back harness, or a collar, when a pet is walked at night or other dark conditions, a position of the pet is not easily detected, and the pet is not easy to be seen by people and passersby may be startled when the pet comes running out. Therefore, it is necessary to propose a pet light-emitting safety device that is able to emit light at multiple levels, so that the position of the pet is easily observed in dark conditions. At present, although there are pet chest harnesses or collars with light-emitting devices on the market, most of them use LED light strips as light-emitting strips. LED light strips generally generate a lot of heat when working, which make pets feel uncomfortable. Thus, the conventional chest and back harnesses, and the collars in the prior art still need to be improved.

SUMMARY

Aiming at deficiencies of the prior art, the present disclosure proposes a pet light-emitting safety device, which emits light to outside by light guide bar guiding light. The light guide bar is arbitrarily arranged on a pet lasso tool as required. The light guide bar has a variety of lighting modes, good lighting effect, convenient operation, high pet wearing comfort, and high safety.

The present disclosure discloses a pet light-emitting safety device. The pet configured to control light transmitted to the light guide bar.

The light guide bar comprises a light-emitting body and fixing portions connected to two ends of the light-emitting body. One end of each of the fixing portions defines an end surface configured to input the light.

The light source controller comprises a box body, a main control board accommodated in the box body, and light sources connected to the main control board. Sides of the box body defines channels configured to fix the fixing portions. The fixing portions are separately inserted into a corresponding channel of the channels. Each of the light sources is arranged on one end of each of the fixing portions away from the corresponding channel of the channels. A light-emitting surface of each of the light sources faces the end surface of a corresponding fixing portion of the fixing portions.

Furthermore, the light sources are two light sources. The light sources comprise a first light-emitting light source arranged on a first side of the main control board and a second light-emitting light source arranged on a second side of the main control board.

Furthermore, the first light-emitting light source and the second light-emitting light source emit same color light or different color light.

Furthermore, the first light-emitting light source and the second light-emitting light source are light-emitting diodes.

Furthermore, accommodating cavities configured to accommodate the light-emitting diodes are provided in the box body.

Furthermore, clamping blocks configured to fix the light emitting diodes are arranged on inner walls of the accommodating cavities.

Furthermore, a communication module is arranged on the main control board. The communication module is configured to communicate with an external application (APP) installed in a personal terminal.

Furthermore, the box body comprises a shell body and a cover body snapped on the shell body. A button pressable and movable is arranged on the cover body. The button is arranged corresponding to a tact switch on an upper end of the main control board.

Furthermore, an energy storage battery configured to supply power is arranged on a lower end of the main control board. The energy storage battery is a lithium battery.

Furthermore, a charging interface electrically connected to the main control board is arranged on one side of the box body. The charging interface is configured to connect to an external power adapter to charge the lithium battery.

Furthermore, a bottom portion of the box body defines a through groove; a flexible band passes through the through groove to fix the box body.

In the pet light-emitting safety device of the present disclosure, the light guide bar is configured to guide the light and emit the light out. The light guide bar is arbitrarily arranged on a pet lasso tool as required. The light guide bar have a variety of lighting modes, good lighting effect, convenient operation, high pet wearing comfort, and high safety.

The present disclosure discloses a pet chest and back harness. The pet chest and back harness comprises a chest harness and a back harness. Connecting belts are arranged on two ends of the chest harness and two ends of the back harness. The connecting belts are buckled and connected through male buckles and female buckles arranged on ends of the connecting belts to form a chest and back harness main body.

The pet chest and back harness further comprises the pet light-emitting safety device for pet night light warning and decoration. The pet light-emitting safety device comprises a light guide bar and a light source controller configured to control light transmitted to the light guide bar.

The light guide bar comprises a light-emitting body and fixing portions separately connected to one end of each of the light-emitting body. One end of each of the fixing portions defines an end surface configured to input the light.

The light source controller comprises a box body, a main control board accommodated in the box body, and light sources connected to the main control board. Sides of the box body defines channels configured to fix the fixing portions. The fixing portions are separately inserted into a corresponding channel of the channels. Each of the light sources is arranged on one end of each of the fixing portions away from the corresponding channel of the channels. A light-emitting surface of each of the light sources faces the end surface of a corresponding fixing portion of the fixing portions.

A light-transmitting sleeve is arranged along a peripheral edge of an upper surface of the back harness. The light-transmitting sleeve is sleeved on the light-emitting body of the light guide bar.

Furthermore, the light-transmitting sleeve defines openings. Each of the fixing portions of the light guide bar extends out of the light-transmitting sleeve from a corresponding opening of the openings.

Furthermore, adjusting buckles configured to adjust a length of a corresponding connecting belt of the connecting belts are arranged on the connecting belts.

Furthermore, reflective strips are arranged along a length direction of the connecting belts.

The pet chest and back harness of the present disclosure has a simple structure and can be quickly and conveniently worn by pets. Differing from conventional LED light strips configured as light-emitting sources, the present disclosure uses two light sources to emit light to the two ends of the light guide bar respectively, which have variety of lighting modes, low heat generation, good lighting effect, convenient operation, high pet wearing comfort, and high safety.

The present disclosure further discloses a pet collar. The pet collar comprises a collar body, and a movable connecting device.

The collar body is a flexible belt body. The movable connecting device comprises a clasp arranged on a first end of the flexible belt body and a plurality of buckle holes arranged at intervals defined on a second end of the flexible belt body. The clasp is connected to one of the buckle holes to form a ring structure.

The pet collar further comprises a pet light-emitting safety device. The pet light-emitting safety device is arranged on the flexible belt body. The pet light-emitting safety device comprises a light guide bar and a light source controller configured to control light transmitted to the light guide bar.

The light guide bar comprises a light-emitting body and fixing portions connected to two ends of the light-emitting body. One end of each of the fixing portions defines an end surface configured to input the light.

The light source controller comprises a box body, a main control board accommodated in the box body, and light sources connected to the main control board. Sides of the box body defines channels configured to fix the fixing portions. The fixing portions are separately inserted into a corresponding channel of the channels. Each of the light sources is arranged on one end of each of the fixing portions away from the corresponding channel of the channels. A light-emitting surface of each of the light sources faces the end surface of a corresponding fixing portion of the fixing portions.

Furthermore, a transparent hose is arranged along a side edge of the flexible belt body. The transparent tube is sleeved on the light-emitting body of the light guide bar.

Furthermore, a protection pad is arranged on an inner side of the flexible belt body. A width of the protection pad is equal to a width of the flexible belt body.

Furthermore, reflective tapes are arranged on an outer surface of the flexible belt body along a length direction of the flexible belt body.

In the present disclosure, the pet collar is capable of emitting light and has a simple structure, and can be quickly and conveniently worn by the pets. Differing from conventional LED light strips configured as light-emitting sources, the present disclosure uses two light sources to emit light to the two ends of the light guide bar respectively, which has low heat generation, has variety of lighting modes, has generate brilliant brilliance, has good lighting effect, is convenient to operate, and is comfortable to wear for the pets.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

In the drawings.

Figure 1:
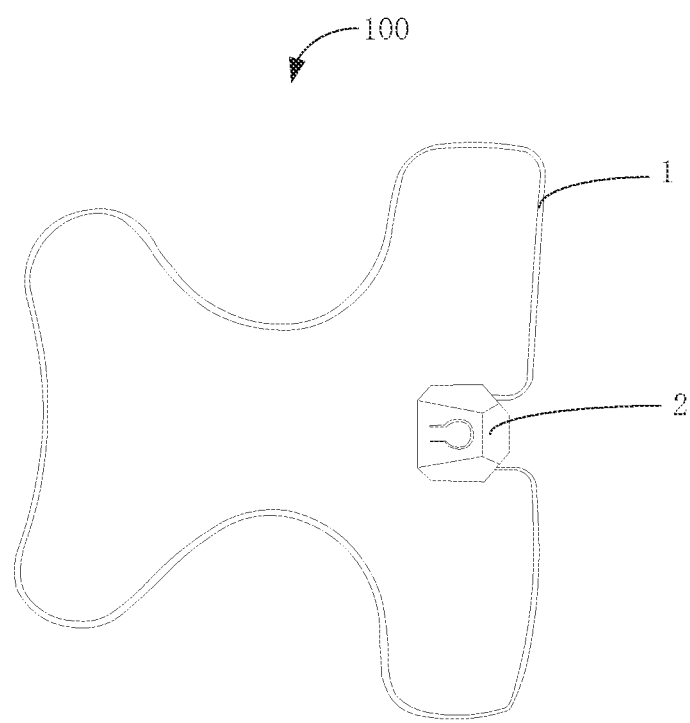
FIG. 1 is a schematic diagram of a pet light-emitting safety device according to one embodiment of the present disclosure.

pet light-emitting safety device—100; light guide bar—1; light-emitting body—11; fixing portions—12*a*, 12*b*; end faces—13*a*, 13*b*; light source controller—2; box body—20; main control board—21; light sources—22*a*, 22*b*; first light-emitting light source—22*a*; second light-emitting light source—22*b*; channels—23*a*, 23*b*; accommodating cavities—24*a*, 24*b*; button—25; tact switch—26; energy storage battery—27; charging interface—28; through groove—29; pet chest and back harness—200; chest harness—201; back harness—202; connecting belts—203; male buckle—204; female buckle—205; light-transmitting sleeve—206; adjusting buckle—207; reflective strip—208; pet collar—300; flexible belt body—301; clasp—302; button hole—303; transparent hose—304; protection pad—305.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

As shown in FIGS. 1-5, one embodiment of the present disclosure discloses a pet light-emitting safety device 100. The pet light-emitting safety device 100 comprises a light guide bar 1 and a light source controller 2 configured to control light transmitted to the light guide bar 1.

The light guide bar 1 can be installed on a pet lasso tool as required (it should be noted that the light guide bar should not be bent at 90°), such as a pet chest and back harness, or a pet collar. When walking a pet at night or other dark conditions, by wearing the pet lasso tool provided with the light guide bar, a position of the pet is easily detected, and passersby are prevented from being startled when the pet comes running out.

The light guide bar 1 comprises a light-emitting body 11 and fixing portions 12a and 12b connected to two ends of the light-emitting body 11. One end of each of the fixing portions 12a and 12b defines an end surface 13a and 13b configured to input the light. Optionally, the light guide bar 1 are optical fibers The light source controller comprises a box body 20, a main control board 21 accommodated in the box body 20, and light sources 22a and 22b connected to the main control board 21. Sides of the box body 20 defines two channels 23a and 23b configured to fix the fixing portions 12a, 12b. The fixing portions 12a, 12b are separately inserted into a corresponding channel of the channels 23a, 23b. The fixing portions 12a, 12b are inserted into the channels 23a, 23b and are tightly connected to the channels 23a, 23b, so they are not easy to loose. Each of the light sources 22a and 22b is arranged on one end of each of the fixing portions away from the corresponding channel of the channels 23a and 23b. Accommodating cavities 24a and 24b configured to accommodate the light sources 22a and 22b are defined in the box body 20. Clamping blocks (not shown in the drawings) configured to fix the light sources 22a and 22b are arranged on inner walls of the accommodating cavities. A light-emitting surface of each of the light sources 22a, 22b faces the end surface 13a, 13b of a corresponding fixing portion of the fixing portions.

The light sources 22a and 22b are two light sources. The light sources comprise a first light-emitting light source 22a arranged on a first side of the main control board 21 and a second light-emitting light source 22b arranged on a second side of the main control board 21. The first light-emitting light source 22a and the second light-emitting light source 22b are light-emitting diodes. The first light-emitting light source 22a and the second light-emitting light source 22b emit same color light or different color light. For example. In the embodiment, the first light-emitting light source 22a emits red light and the second light-emitting light source 22b emits blue light.

The box body 20 comprises a shell body and a cover body snapped on the shell body. A button 25 pressable and movable is arranged on the cover body. The buttons 25 is arranged corresponding to a tact switch 26 arranged on an upper end of the main control board 21. An energy storage battery 27 configured to supply power is arranged on a lower end of the main control board 21. The energy storage battery 27 is a lithium battery A charging interface 28 electrically connected to the main control board 21 is arranged on one side of the box body 20. The charging interface 28 is configured to connect to an external power adapter to charge the lithium battery. A bottom portion of the box body 20 defines a through groove 29. A flexible band passes through the through groove 29 to fix the box body 20.

It should be noted that the pet light-emitting safety device 100 of the present disclosure has a variety of working modes, and the working modes are selected by pressing the button 25 for different times. The working modes comprises a lighting on mode, a lighting off mode, a flash mode, and a constant lighting mode. The flash mode comprises a fast flash mode and a slow flash mode. A flash frequency is predetermined. For example, when the button 25 is pressed once, the pet light-emitting safety device 100 is in the fast flash mode. When the button 25 is pressed twice, the pet light-emitting safety device 100 is in the slow flash mode. When the button 25 is pressed three times, the pet light-emitting safety device 100 is in the constant lighting mode. When the button 25 is pressed four times, the pet light-emitting safety device 100 is in the lighting off mode.

Furthermore, a communication module is arranged on the main control board 21. Optionally, the communication module is a BLUETOOTH chip, The BLUETOOTH chip is configured to communicate with an external application (APP) installed in a mobile phone. Through the APP installed in the mobile phone, the pet light-emitting safety device 100 is remotely controlled to work. For example, the working modes are selected on the APP installed in the mobile phone, or a brightness of the light sources 22a and 22b is controlled.

When in use, the working modes are selected by pressing the button 25 for different times. For example: when the button 25 is pressed once, the pet light-emitting safety device 100 is in the fast flash mode. A front surface of the first light-emitting light source 22a emits red light to a first end face 13a of the light guide bar 1, a front surface of the second light-emitting light source 22b emits the blue light to a second end face 13b of the light guide bar 1.

Therefore, a first section of the light-emitting body 11 of the light guide bar 1 close to the first light-emitting light source 22a mainly presents red light, a second section of the light-emitting body 11 of the light guide bar 1 close to the second light-emitting light source 22b mainly presents blue light. Further, because the red light and the blue light are mixed at a middle section of the light-emitting body 11 to emit blue-violet light, the light-emitting body 11 of the light guide bar 1 flashes and the light emitted is colorful, so that the driving on the road can notice the pet and a user in time. Thus, safety of the pet and the user is improved when they are walking at night. By pressing the button 25 for different times, other working modes are selected, which are not described in detail herein.

As shown in FIGS. 1-8, the present disclosure discloses a pet chest and back harness 200. The pet chest and back harness comprises a chest harness 201 and a back harness 202. Connecting belts 203 are arranged on two ends of the chest harness 201 and two ends of the back harness 202. The connecting belts 203 are buckled and connected through male buckles 204 and female buckles 205 arranged on ends of the connecting belts 203 to form a chest and back harness main body. The pet chest and back harness 200 further comprises the pet light-emitting safety device 100 for pet night light warning and decoration. The pet light-emitting safety device comprises a light guide bar 1 and a light source controller 2 configured to control light transmitted to the light guide bar 1.

The light guide bar 1 comprises a light-emitting body 11 and fixing portions 12a and 12b connected to two ends of the light-emitting body 11. One end of each of the fixing portions 12a and 12b defines an end surface 13a and 13b configured to input the light.

The light source controller comprises a box body 20, a main control board 21 accommodated in the box body 20, and light sources 22a and 22b connected to the main control board 21. Sides of the box body 20 defines two channels 23a and 23b configured to fix the fixing portions 12a, 12b. The fixing portions 12a, 12b are separately inserted into a corresponding channel of the channels 23a, 23b. The fixing portions 12a, 12b are inserted into the channels 23a, 23b and are tightly connected to the channels 23a, 23b, so they are not easy to loose. Each of the light sources 22a and 22b is arranged on one end of each of the fixing portions away from the corresponding channel of the channels 23a and 23b. Accommodating cavities 24a and 24b configured to accommodate the light sources 22a and 22b are defined in the box body 20. Clamping blocks (not shown in the drawings) configured to fix the light sources 22a and 22b are arranged on inner walls of the accommodating cavities. A light-emitting surface of each of the light sources 22a, 22b faces the end surface 13a, 13b of a corresponding fixing portion of the fixing portions.

The chest harness 201 of the embodiment fits the pet's chest. A rear end of the chest harness 201 extends along left and right sides to form a Y shape, and a front end of the chest harness 201 fits the pet's neck. The chest harness 201 is made of multiple layers of breathable and skin-friendly materials, which provide a certain degree of cushioning and breathability after fitting the pet's chest, so the pet does not feel stuffy or uncomfortable when wearing it. The back harness 202 fits the pet's back, and front and rear ends of the back harness 202 extend along left and right sides of the back harness 202 to form an I-shape back harness 202. The back harness 202 is made of multiple layers of breathable and skin-friendly materials, which provide a certain degree of cushioning and breathability after fitting the pet's back, so the pet does not feel stuffy or uncomfortable when wearing it.

The connecting belts 203 is made of Teflon material. Since the Teflon material has good wear resistance, it can prevent pets from scratching and biting the connecting belts. It should be understood that the material of the connection belts 203 is not limited to the Teflon material in the embodiment. In other embodiments, the connecting belts are made of leather according to actual production requirements. The connecting belts made of leather are skin-friendly and do not cause adverse reactions to the pet's skin, which well eliminates user's worries. The connecting belts made of leather also have certain durability. The connecting belts 203 in the present disclosure may made of other materials, which are not described herein.

A light-transmitting sleeve 206 is arranged along a peripheral edge of an upper surface of the back harness 202. An outer side of the light-transmitting sleeve 206 is connected with the peripheral edge of the upper surface of the back harness 202 by sewing. The light-transmitting sleeve 206 is sleeved on the light-emitting body of the light guide bar.

The light-transmitting sleeve 206 defines openings. Each of the fixing portions of the light guide bar extends out of the light-transmitting sleeve from a corresponding opening of the openings. Therefore, the light guide bar is convenient to install and disassemble.

In order to prolong service life of the pet chest and back harness 200 and make it still being used even when the pet grows up, and in order to suit with pets of different sizes, adjusting buckles 207 configured to adjust a length of a corresponding connecting belt 203 of the connecting belts 203 are arranged on the connecting belts 203. The adjustment is made according to a size of the pet's neck and chest. The adjusting buckles 207 are in a shape of a Chinese character of 日 ", which is convenient for use.

In order to allow the user to take the pet for a walk safely at night, reflective strips 208 are arranged along a length direction of the connecting belts as a sign at night. The reflective strips 208 reflect the light after being irradiated by light, so that the driving on the road notices the pet and the user in time, and the safety is further improved when they are walking at night.

The pet chest and back harness of the present disclosure has a simple structure and can be quickly and conveniently worn by pets. Differing from conventional LED light strips configured as light-emitting sources, the present disclosure uses two light sources to emit light to the two ends of the light guide bar respectively, which has variety of lighting modes, low heat generation, good lighting effect, convenient operation, high pet wearing comfort, and high safety.

Figure 9:
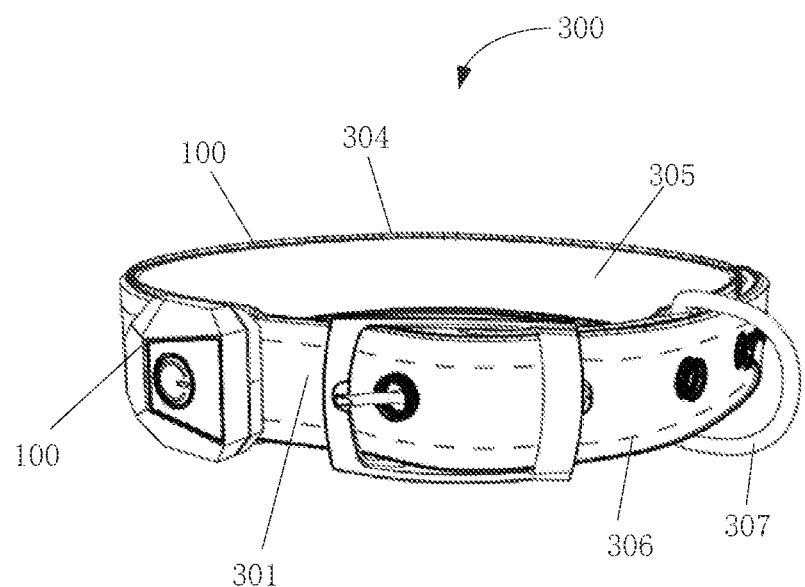
FIG. 9 is a schematic diagram of a pet collar according to one embodiment of the present disclosure.
Figure 10:
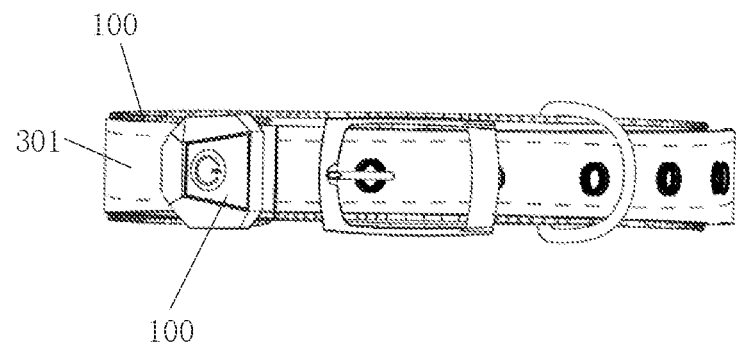
FIG. 10 is another schematic diagram of the pet collar according to one embodiment of the present disclosure.
Figure 11:
FIG. 11 is another schematic diagram of the pet collar shown in an open state according to one embodiment of the present disclosure.

As shown in FIGS. 9-11, the present disclosure further discloses a pet collar 300. The pet collar 300 comprises a collar body and a movable connecting device.

The collar body 301 is a flexible belt body. The movable connecting device comprises a clasp 302 arranged on a first end of the flexible belt body 301 and a plurality of buckle holes 303 arranged at intervals defined on a second end of the flexible belt body. The clasp 302 is connected to one of the buckle holes 303 to form a ring structure. The pet collar further comprises a pet light-emitting safety device 100. The pet light-emitting safety device 100 is arranged on the flexible belt body 301.

Figure 2:
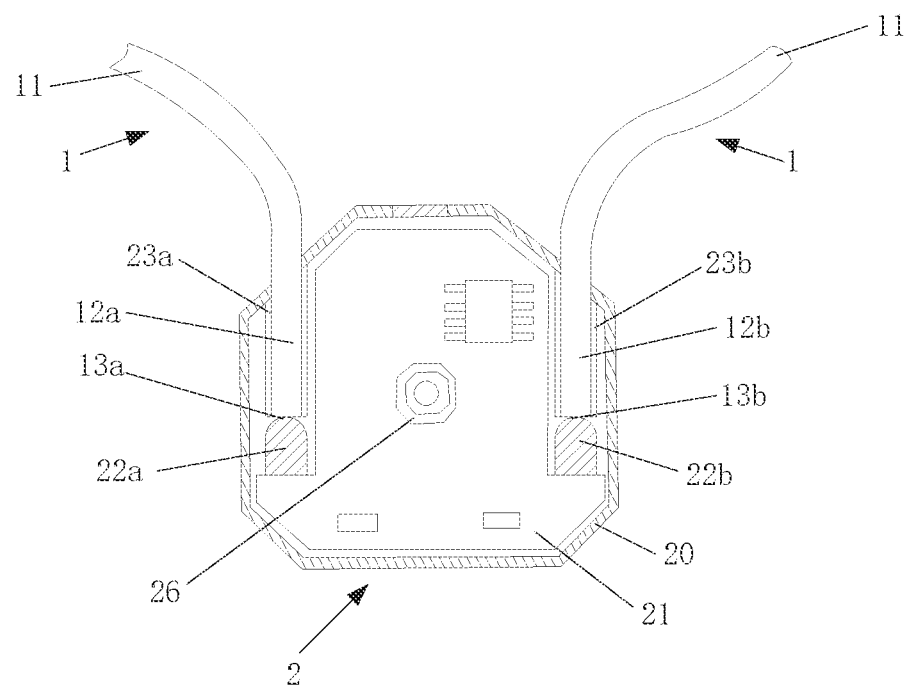
FIG. 2 is a cross-sectional schematic diagram of portions of the pet light-emitting safety device according to one embodiment of the present disclosure.
Figure 3:
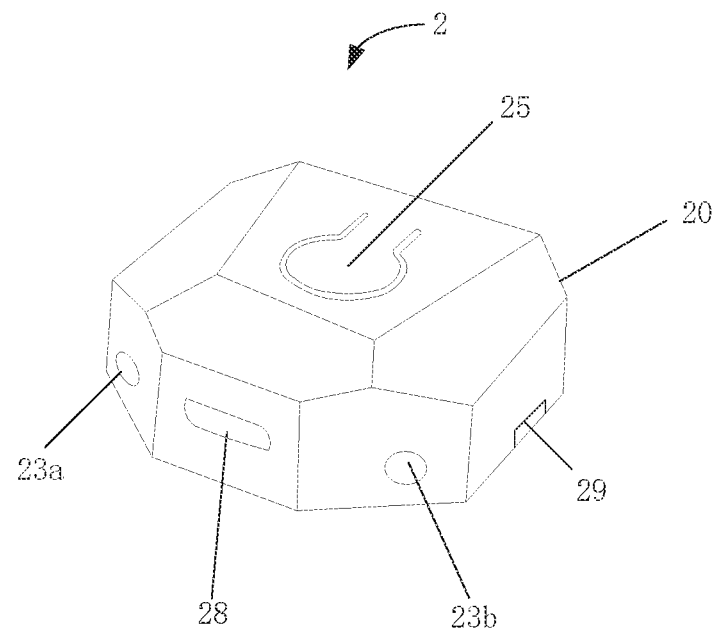
FIG. 3 is a schematic diagram of a box body of the pet light-emitting safety device according to one embodiment of the present disclosure.
Figure 4:
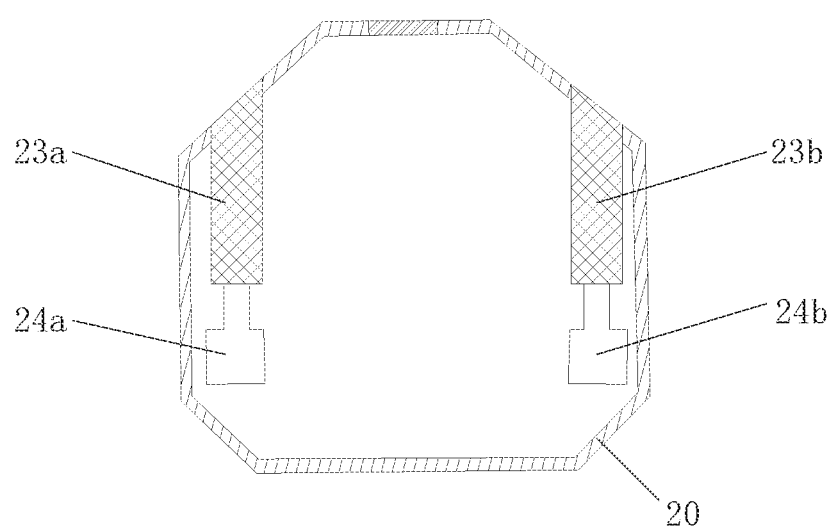
FIG. 4 is a cross-sectional schematic diagram of the box body of the pet light-emitting safety device according to one embodiment of the present disclosure.
Figure 5:
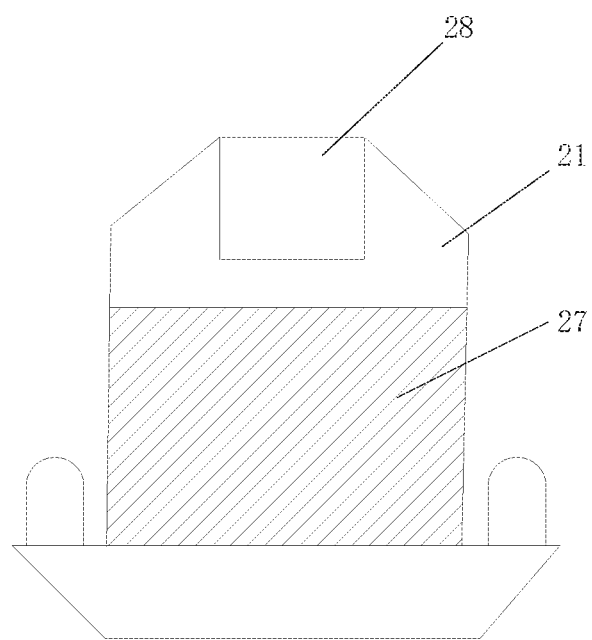
FIG. 5 is a cross-sectional schematic diagram of a main control board of the pet light-emitting safety device according to one embodiment of the present disclosure.
Figure 6:
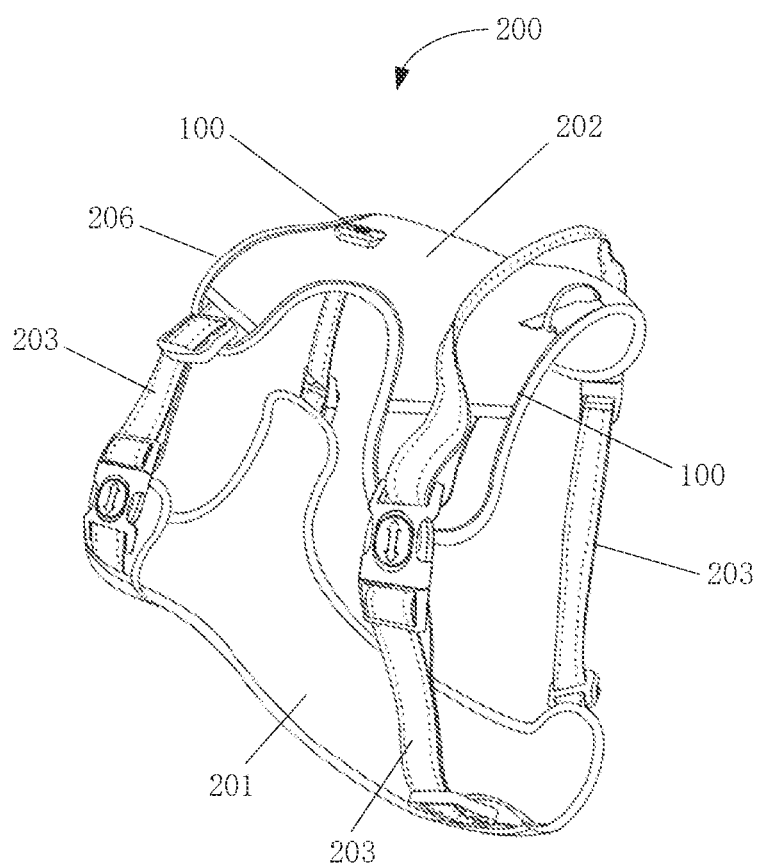
FIG. 6 is a schematic diagram of a pet chest and back harness according to one embodiment of the present disclosure.
Figure 7:
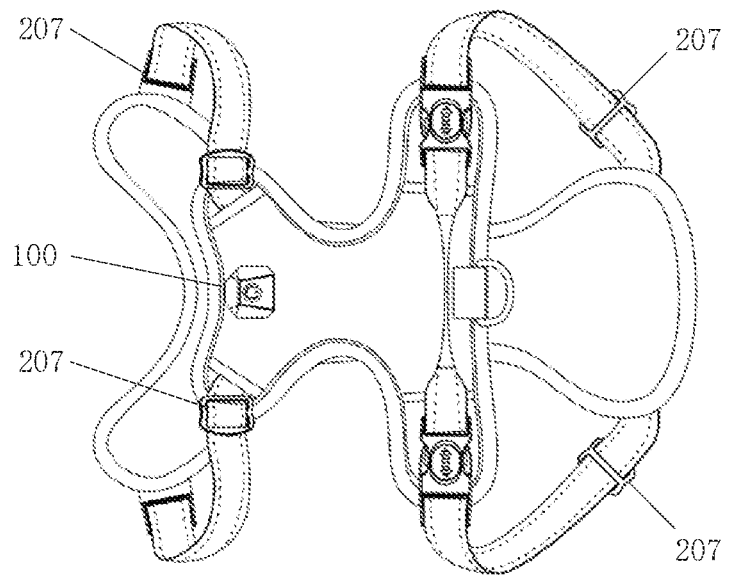
FIG. 7 is another schematic diagram of the pet chest and back harness according to one embodiment of the present disclosure.
Figure 8:
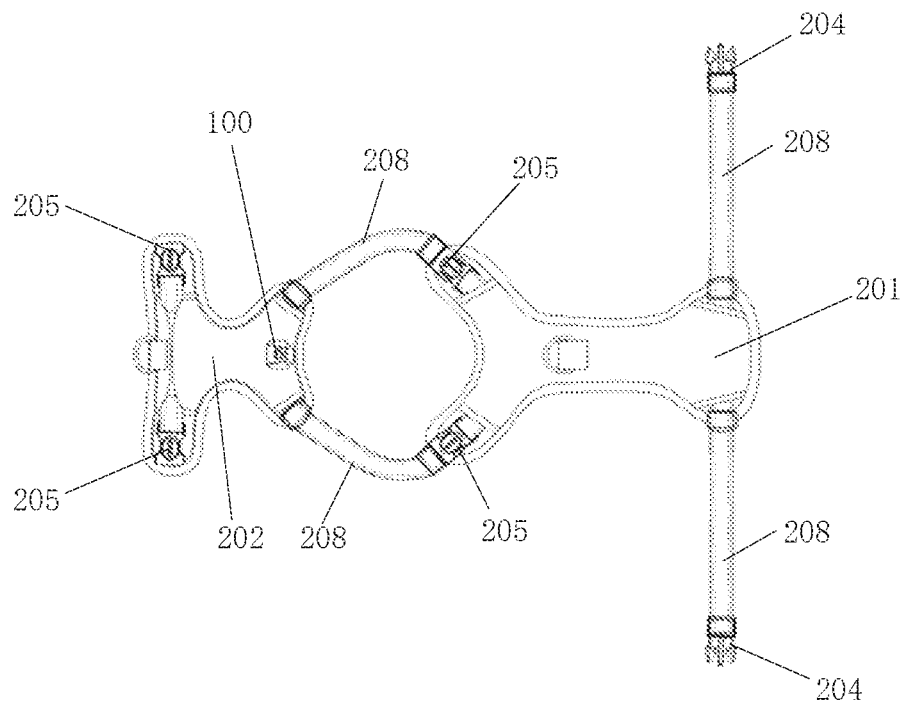
FIG. 8 is a schematic diagram of the pet chest and back harness shown in an open state according to one embodiment of the present disclosure.

As shown in FIGS. 1-3, the pet light-emitting safety device 100 comprises a light guide bar 1 and a light source controller configured to control light transmitted to the light guide bar 1.

The light guide bar 1 comprises a light-emitting body 11 and fixing portions 12a and 12b connected to two ends of the light-emitting body 11. One end of each of the fixing portions 12a and 12b defines an end surface 13a and 13b configured to input the light.

The light source controller comprises a box body 20, a main control board 21 accommodated in the box body 20, and light sources 22a and 22b connected to the main control board 21. Sides of the box body 20 defines two channels 23a and 23b configured to fix the fixing portions 12a, 12b. The fixing portions 12a, 12b are separately inserted into a corresponding channel of the channels 23a, 23b. The fixing portions 12a, 12b are inserted into the channels 23a, 23b and are tightly connected to the channels 23a, 23b, so they are not easy to loose. Each of the light sources 22a and 22b is arranged on one end of each of the fixing portions away from the corresponding channel of the channels 23a and 23b. Accommodating cavities 24a and 24b configured to accommodate the light sources 22a and 22b are defined in the box body 20. Clamping blocks (not shown in the drawings) configured to fix the light sources 22a and 22b are arranged on inner walls of the accommodating cavities. A light-emitting surface of each of the light sources 22a, 22b faces the end surface 13a, 13b of a corresponding fixing portion of the fixing portions. A transparent hose is arranged along a side edge of the flexible belt body. The transparent tube is sleeved on the light-emitting body of the light guide bar.

As shown in FIGS. 9-11, a protection pad 305 is arranged on an inner side of the flexible belt body 301. A width of the protection pad 305 is equal to a width of the flexible belt body 301. When in use, a surface of the protection pad contacts the pet.

In order to allow the user to take the pet for a walk safely at night, reflective tapes 306 are arranged on an outer surface of the flexible belt body 301 along a length direction of the flexible belt body 301. A length of the reflective tapes 306 is same as a length of the flexible belt body 301. In the embodiment, a plurality of reflective tapes 306 is provided. Optionally, two reflective tapes 306 are provided. The reflective tapes 306 are configured as a sign at night. The reflective tapes 306 reflect the light after being irradiated by light, so that the driving on the road notices the pet and the user in time, and the safety is further improved when they are walking at night.

A ring buckle 307 configured to connect to a traction rope is arranged on the flexible belt body 301.

In the present disclosure, the pet collar is capable of emitting light and has a simple structure, and can be quickly and conveniently worn by pets. Differing from conventional LED light strips configured as light-emitting sources, the present disclosure uses two light sources to emit light to the two ends of the light guide bar respectively, which has low heat generation, has variety of lighting modes, has generate brilliant brilliance, has good lighting effect, is convenient to operate, and is comfortable to wear for pets.

Although optional embodiments of the present disclosure have been described, additional changes and modifications to these embodiments may be made by those skilled in the art once the basic inventive concepts are known. Therefore, the attached claims are intended to be construed to include the optional embodiments and all changes and modifications that fall within the scope of the present disclosure.

Obviously, those skilled in the art can make various changes and modifications to the embodiments of the present disclosure without departing from the spirit and scope of the embodiments of the present disclosure. Thus, if these changes and modifications of the embodiments of the present disclosure fall within the scope of the claims of the present disclosure and their equivalents, then the present disclosure also includes such changes and modifications.

What is claimed is:

1. A pet chest and back harness, comprising:
a chest harness and a back harness;
wherein connecting belts are arranged on two ends of the chest harness and two ends of the back harness; and the connecting belts are buckled and connected through male buckles and female buckles arranged on ends of the connecting belts to form a chest and back harness main body;
wherein the pet chest and back harness further comprises a pet light-emitting safety device for pet night light warning and decoration; the pet light-emitting safety device comprises a light guide bar and a light source controller configured to control light transmitted to the light guide bar;
wherein the light guide bar comprises a light-emitting body and fixing portions connected to two ends of each of the light-emitting body; one end of each of the fixing portions defines an end surface configured to input the light;
wherein the light source controller comprises a box body, a main control board accommodated in the box body, and light sources connected to the main control board; sides of the box body defines channels configured to fix the fixing portions; the fixing portions are separately inserted into a corresponding channel of the channels; each of the light sources is arranged on one end of each of the fixing portions away from the corresponding channel of the channels; a light-emitting surface of each of the light sources faces the end surface of a corresponding fixing portion of the fixing portions;
wherein a light-transmitting sleeve is arranged along a peripheral edge of an upper surface of the back harness; the light-transmitting sleeve is sleeved on the light-emitting body of the light guide bar;
wherein the light-transmitting sleeve defines openings, each of the fixing portions of the light guide bar extends out of the light-transmitting sleeve from a corresponding opening of the openings.

2. The pet chest and back harness according to claim 1, wherein adjusting buckles configured to adjust a length of a corresponding connecting belt of the connecting belts are arranged on the connecting belts.

3. The pet chest and back harness according to claim 2, wherein reflective strips are arranged along a length direction of the connecting belts.

4. The pet chest and back harness according to claim 1, wherein the light sources are two light sources; the light sources comprise a first light-emitting light source arranged on a first side of the main control board and a second light-emitting light source arranged on a second side of the main control board.

5. The pet chest and back harness according to claim 4, wherein the first light-emitting light source and the second light-emitting light source emit a same color light or a different color light.

6. The pet chest and back harness according to claim 5, wherein the first light-emitting light source and the second light-emitting light source are light-emitting diodes.

7. The pet chest and back harness according to claim 6, wherein the box body defines accommodating cavities configured to accommodate the light-emitting diodes.

8. The pet chest and back harness according to claim 7, wherein clamping blocks configured to fix the light emitting diodes are arranged on inner walls of the accommodating cavities.

9. The pet chest and back harness according to claim 1, wherein a communication module is arranged on the main control board; the communication module is configured to communicate with an external application (APP) installed in a personal terminal.

10. The pet chest and back harness according to claim 1, wherein the box body comprises a shell body and a cover body snapped on the shell body; a button pressable and movable is arranged on the cover body; the button is arranged corresponding to a tact switch arranged on an upper end of the main control board.

11. The pet chest and back harness according to claim 10, an energy storage battery configured to supply power is arranged on a lower end of the main control board; the energy storage battery is a lithium battery.

12. The pet chest and back harness according to claim 11, wherein a charging interface electrically connected to the main control board is arranged on one side of the box body; the charging interface is configured to connect to an external power adapter to charge the lithium battery.

13. The pet chest and back harness according to claim 12, a bottom portion of the box body defines a through groove; a flexible band passes through the through groove to fix the box body.

* * * * *